(12) United States Patent
Inglett et al.

(10) Patent No.: US 8,745,114 B2
(45) Date of Patent: *Jun. 3, 2014

(54) ADDING ENTROPY FOR IMPROVED RANDOM NUMBER GENERATION IN A COMPUTER SYSTEM

(71) Applicant: International Business Machines Corporation, Armonk, NY (US)

(72) Inventors: Todd A. Inglett, Rochester, MN (US); Andrew T. Tauferner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/684,073

(22) Filed: Nov. 21, 2012

(65) Prior Publication Data

US 2013/0086136 A1    Apr. 4, 2013

Related U.S. Application Data

(63) Continuation of application No. 12/474,356, filed on May 29, 2009.

(51) Int. Cl.
*G06F 7/58* (2006.01)

(52) U.S. Cl.
USPC ............................. 708/255; 708/250; 714/800

(58) Field of Classification Search
USPC .................................. 708/250, 255; 714/800
See application file for complete search history.

(56) References Cited

U.S. PATENT DOCUMENTS

| | | | |
|---|---|---|---|
| 5,774,483 A | 6/1998 | Hwang | |
| 6,628,786 B1 * | 9/2003 | Dole | 380/44 |
| 7,571,199 B1 * | 8/2009 | Field et al. | 708/250 |
| 2002/0172359 A1 * | 11/2002 | Saarinen | 380/46 |
| 2003/0074629 A1 | 4/2003 | Levin | |
| 2005/0055390 A1 * | 3/2005 | Xie et al. | 708/250 |
| 2007/0230693 A1 * | 10/2007 | Mueller et al. | 380/46 |
| 2007/0230694 A1 * | 10/2007 | Rose et al. | 380/46 |
| 2010/0106756 A1 * | 4/2010 | Ellison | 708/212 |
| 2010/0131796 A1 * | 5/2010 | Engelbrecht et al. | 714/15 |
| 2011/0075840 A1 | 3/2011 | Zayas et al. | |

OTHER PUBLICATIONS

Entropy (information theory), http://en.wikipedia.org/wiki/Information_entropy, pp. 1-12, May 12, 2009.

(Continued)

*Primary Examiner* — Shew-Fen Lin
(74) *Attorney, Agent, or Firm* — Martin & Associates LLC; Derek P. Martin (57) ABSTRACT

A parallel computer system adds entropy to improve the quality of random number generation by using parity errors as a source of entropy because parity errors are influenced by external forces such as cosmic ray bombardment, alpha particle emission, and other random or near-random events. By using parity errors and associated information to generate entropy, the quality of random number generation in a parallel computer system is increased.

6 Claims, 8 Drawing Sheets

(56) References Cited

OTHER PUBLICATIONS

Eric Uner, Generating Random Numbers, May 24, 2004, http://www.embedded.com/columns/technicalinsights/20900500?_requestid=178976.

Entropy (computing), http://en.wikipedia.org/wiki/Entropy_(computing), May 29, 2009.

Monte Carlo method, http://en.wikipedia.org/wiki/Monte_Carlo_method, May 29, 2009.

J.F. Ziegler, et al., IBM experiments in soft fails in computer electronics (1978-1994), IBM Journal of Research and Development, vol. 40, No. 1, 1996.

M.S. Gordon, et al., Single-event-upset and alpha-particle emission rate measurement techniques, IBM Journal of Research and Development, Mar. 2008.

* cited by examiner

FIG. 12

ADDING ENTROPY FOR IMPROVED RANDOM NUMBER GENERATION IN A COMPUTER SYSTEM

BACKGROUND

1. Technical Field

The claims herein generally relate to computer systems, and more specifically relate to the generation of random numbers in a computer system.

2. Background Art

Random numbers are used in many aspects of modern computer systems. In particular, random numbers are often used in generating appropriate security parameters in a computer system. However, computer systems have a difficult time generating high quality random numbers, i.e., sequences of numbers that are close to being truly random. There are many algorithms that appear to generate random numbers but they typically generate the same sequence of numbers, thus suffering from predictability.

Some computer systems attempt to add entropy to the system that generates random numbers as a way to generate differing sequences of random numbers. Entropy is a measure of the uncertainty associated with a random number. There aren't many good sources of entropy on most computer systems. Some computer systems rely on the seemingly random behavior of a human typing on a keyboard or moving a mouse pointer to introduce entropy. Other known techniques for adding entropy involve the use of time intervals between interrupts, or the occurrence of network errors, although these are not very useful due to the regularity of these intervals or the ability of outside forces to manipulate these intervals.

Computer systems that have limited user input have a particularly difficult time adding entropy to the system to improve the quality of random number generation. For example, embedded systems or highly parallel computer systems may need high-quality random numbers, but may lack the user input as a source of entropy to improve the quality of random number generation. Without a way to add entropy to improve the generation of random numbers in a computer system, many computer systems will continue to suffer from random numbers of lower quality.

BRIEF SUMMARY

A parallel computer system adds entropy to improve the quality of random number generation by using parity errors as a source of entropy because parity errors are influenced by external forces such as cosmic ray bombardment, alpha particle emission, and other random or near-random events. By using parity errors and associated information to generate entropy, the quality of random number generation in a parallel computer system is increased.

The description and examples herein are directed to a massively parallel computer system such as the Blue Gene computer system developed by IBM Corporation, but the claims herein expressly extend to other parallel computer systems as well, whether currently known or developed in the future.

The foregoing and other features and advantages will be apparent from the following more particular description, and as illustrated in the accompanying drawings.

BRIEF DESCRIPTION OF DRAWINGS

The disclosure will be described in conjunction with the appended drawings, where like designations denote like elements, and.

DETAILED DESCRIPTION

The description and claims herein are directed to adding entropy to a parallel computer system by using parity errors as a source of entropy to improve the quality of random number generation. The examples herein are described with respect to the Blue Gene/L massively parallel computer developed by International Business Machines Corporation (IBM). Note, however, the principles herein can be applied to any parallel computer system.

Figure 1:
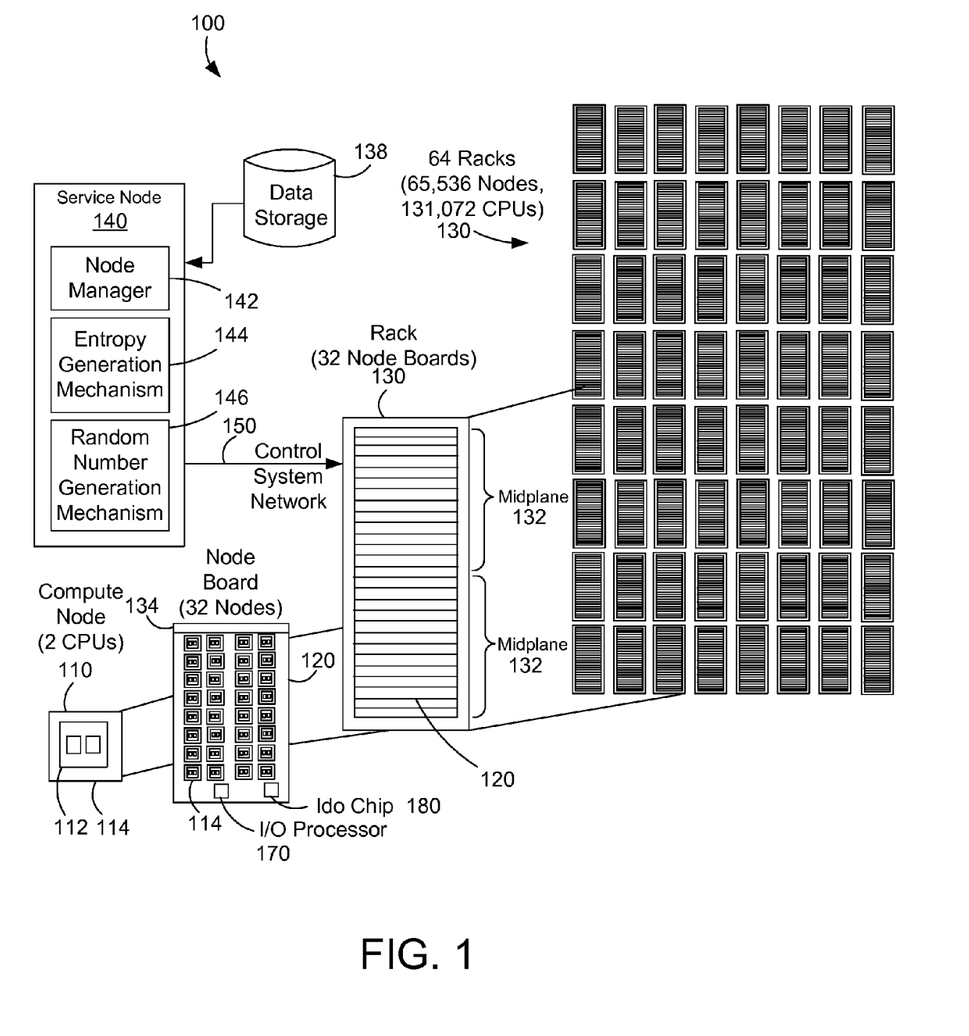
FIG. 1 is a block diagram of a massively parallel computer system.

FIG. 1 shows a block diagram that represents a massively parallel computer system 100 such as the Blue Gene/L computer system. The Blue Gene/L system is a scalable system in which an example number of compute nodes is 65,536. Each node 110 has an application specific integrated circuit (ASIC) 112, also called a Blue Gene/L compute chip 112. The compute chip incorporates two processors or central processor units (CPUs) and is mounted on a node daughter card 114. The node also typically has 512 megabytes of local memory (not shown). A node board 120 accommodates 32 node daughter cards 114 each having a node 110. Thus, each node board has 32 nodes, with 2 processors for each node, and the associated memory for each processor. A rack 130 is a housing that contains 32 node boards 120. Each of the node boards 120 connect into a midplane printed circuit board 132 with a midplane connector 134. The midplane 132 is inside the rack and not shown in FIG. 1. The full Blue Gene/L computer system would be housed in 64 racks 130 or cabinets with 32 node boards 120 in each. The full system would then have 65,536 nodes and 131,072 CPUs (64 racks×32 node boards× 32 nodes×2 CPUs).

The Blue Gene/L computer system structure can be described as a compute node core with an I/O node surface, where communication to 1024 compute nodes 110 is handled by each I/O node that has an I/O processor 170 connected to the service node 140. The I/O nodes have no local storage. The I/O nodes are connected to the compute nodes through the logical collective network and also have functional wide area network capabilities through a gigabit ethernet network (not shown). The gigabit Ethernet network is connected to an I/O processor (or Blue Gene/L link chip) 170 located on a node board 120 that handles communication from the service node 160 to a number of nodes. The Blue Gene/L system has one or more I/O processors 170 on an I/O board (not shown) connected to the node board 120. The I/O processors can be configured to communicate with 8, 32 or 64 nodes. The service node is uses the gigabit network to control connectivity by communicating to link cards on the compute nodes. The connections to the I/O nodes are similar to the connections to the compute node except the I/O nodes are not connected to the torus network.

Again referring to FIG. 1, the computer system 100 includes a service node 140 that handles the loading of the nodes with software and controls the operation of the whole system. The service node 140 is typically a mini computer system such as an IBM pSeries server running Linux with a control console (not shown). While service node 140 is not a compute node, it is a node in the parallel computer system 100. The service node 140 is connected to the racks 130 of compute nodes 110 with a control system network 150. The control system network provides control, test, and bring-up infrastructure for the Blue Gene/L system. The control system network 150 includes various network interfaces that provide the necessary communication for the massively parallel computer system. The network interfaces are described further below.

The service node 140 manages the control system network 150 dedicated to system management. The control system network 150 includes a private 100-Mb/s Ethernet connected to an Ido chip 180 located on a node board 120 that handles communication from the service node 160 to a number of nodes. This network is sometime referred to as the JTAG network since it communicates using the JTAG protocol. All control, test, and bring-up of the compute nodes 110 on the node board 120 is governed through the JTAG port communicating with the service node. The service node includes a node manager 142 for managing the compute nodes. The service node 140 may also include an entropy generation mechanism 144 and a random number generation mechanism 146 as discussed in more detail below.

Figure 2:
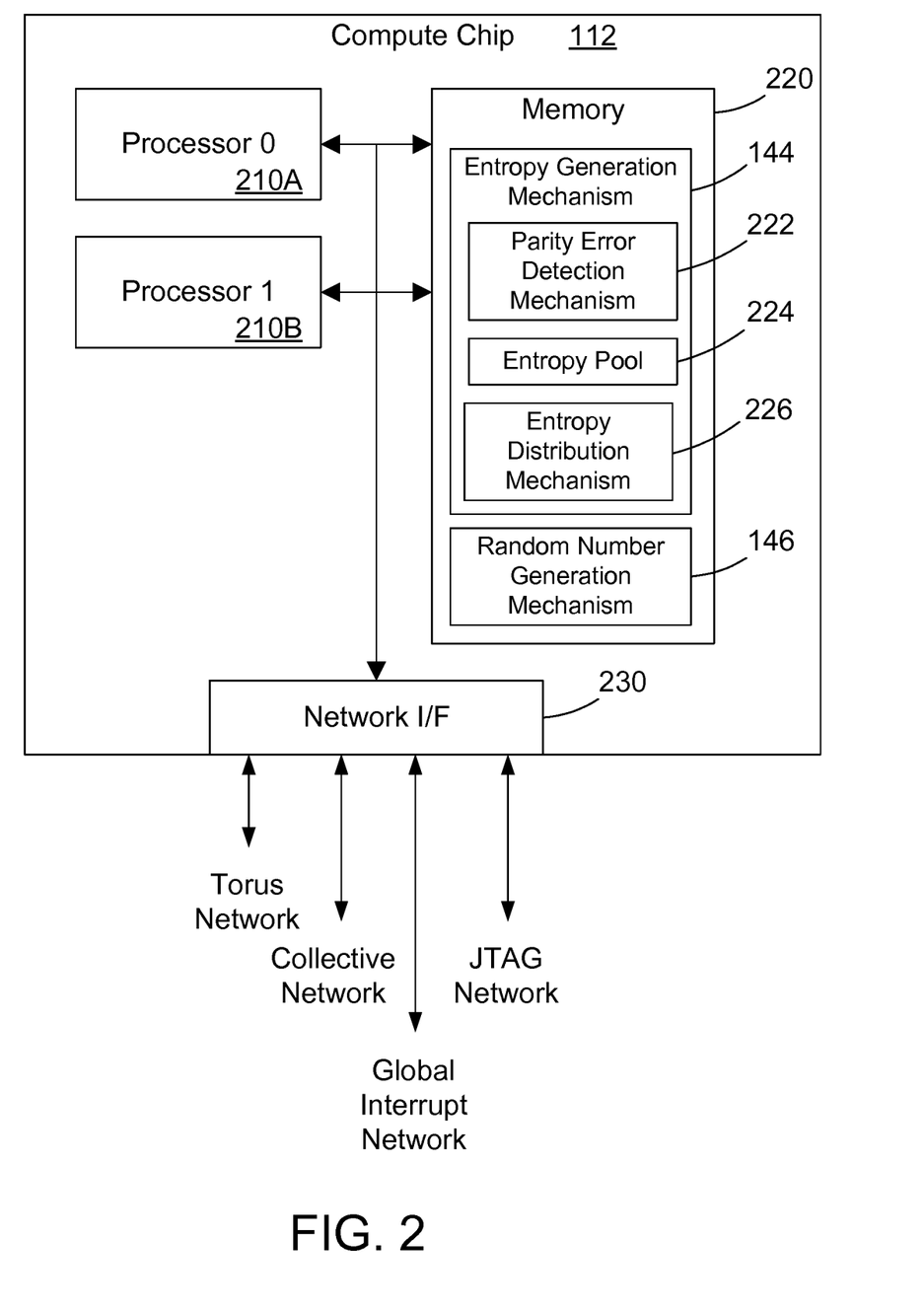
FIG. 2 is a block diagram of a compute chip on a compute node in the massively parallel computer system of FIG. 1.

A simplified block diagram representation of a compute chip 112 on a compute node 110 in FIG. 1 is shown in FIG. 2. The representation of compute chip 112 in FIG. 2 is extremely simplified for the sake of clarity. The compute chip 112 includes two processors 210A and 210B, a memory 220, and a network interface 230. The processors 210A and 210B perform the computing on the compute chip 112. The network interface 230 supports several different networks used to communicate between nodes, including a torus network, a collective network, a global interrupt network, and a JTAG network. The memory 220 includes an entropy generation mechanism 144 and random number generation mechanism 146. The entropy generation mechanism 144 includes a parity error detection mechanism 222, an entropy pool 224, and an entropy distribution mechanism 226. The function of these is discussed in more detail below.

Figure 3:
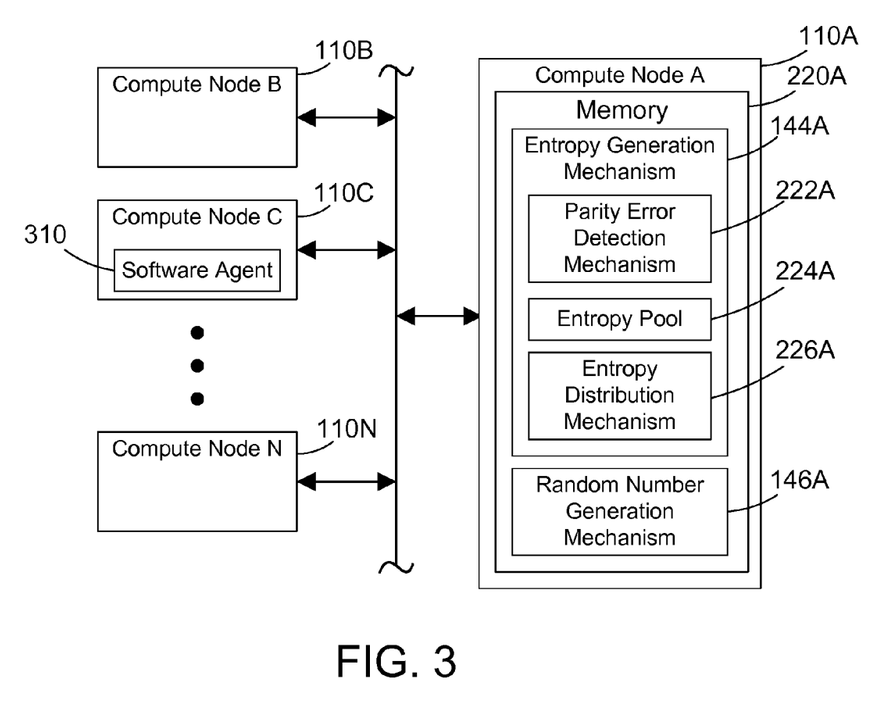
FIG. 3 is a block diagram of a compute node that includes an entropy generation mechanism and a random number generation mechanism coupled to other compute nodes in the massively parallel computer system.

FIG. 3 is a block diagram showing one possible implementation for adding entropy to an entropy pool based on detected parity errors. A first compute node, designated Compute Node 110A, includes all the features shown in the memory 220 in FIG. 2. Coupled to Compute Node 110A are other compute nodes, shown in FIG. 3 as 110B, 110C, . . . , 110N.

The generation of entropy and the generation of a random number based on stored entropy are preferably independent operations. Thus, the entropy generation mechanism 144A uses a parity error detection mechanism 222A to detect when a parity error occurs. In one suitable implementation, the parity error detection mechanism 222A detects parity errors from memory within compute node 110A. In another suitable implementation, the parity error detection mechanism 222A detects parity errors from any suitable memory or portion of memory within the parallel computer system, including memory in other nodes. In yet another specific implementation, the parity error detection mechanism 222A detects parity errors in all memory in all nodes in the computer system. This can be done, for example, by broadcasting to all nodes when a parity error in any node is detected. By detecting parity errors in all of the nodes in a computer system that includes thousands of nodes, the quality of the entropy added to the entropy pool 224A is increased. Parity errors are very useful for adding entropy to the entropy pool 224A because parity errors are influenced by external forces such as cosmic ray bombardment, alpha particle emission, and other random or near-random events. The entropy generation mechanism 144A may optionally include an entropy distribution mechanism 226A that distributes entropy added to the entropy pool 224A to other nodes. The entropy distributed to other nodes may be added to entropy pools on other nodes, or may be used to generate entropy in those nodes based on any suitable criteria or heuristic.

We assume for the specific example in FIG. 3 the compute node 110C includes a software agent 310. A software agent as used in the disclosure and claims herein is any software that needs a random number for any reason. When the software agent 310 needs a random number, it requests a random number from the random number generation mechanism 146A in Compute Node 110A, preferably via a suitable message over one or more of the networks connecting compute node 110C to compute node 110A. In response, the random number generation mechanism 146A uses the entropy stored in the entropy pool 224A to generate a random number. The random number generation mechanism 146A then returns the generated random number to the software agent 310. In response, the software agent transforms the random number to a form usable by the software agent 310. In this manner, a software agent may receive a random number of very high quality due to the entropy generated from one or more parity errors stored in the entropy pool.

Figure 4:
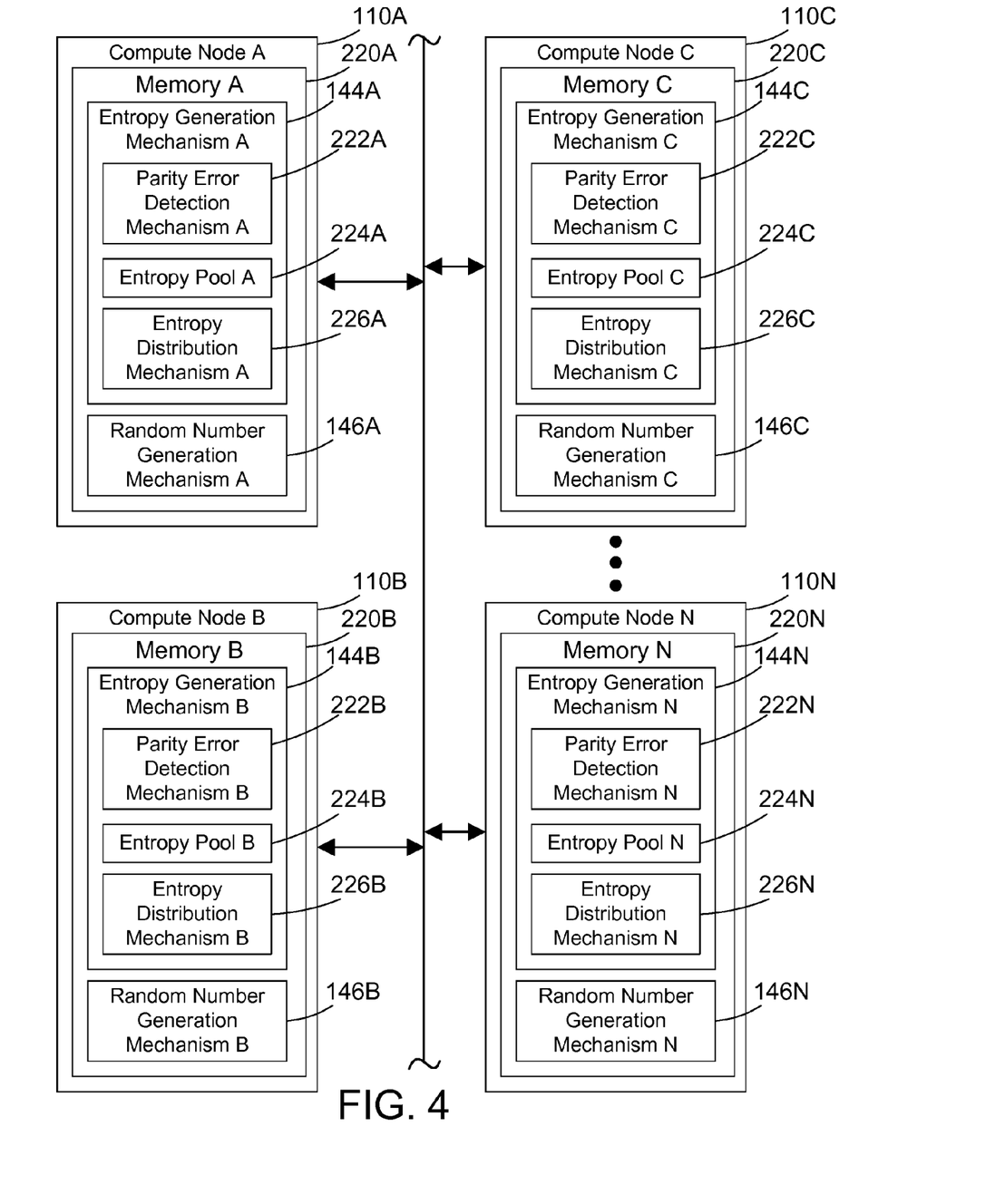
FIG. 4 is a block diagram of multiple compute nodes that each includes an entropy generation mechanism and a random number generation mechanism in the massively parallel computer system.

Another suitable configuration is shown in FIG. 4, where multiple nodes each include respective entropy generation mechanisms and random number generation mechanisms. FIG. 4 shows compute nodes 110A, 110B, 110C, . . . , 110N. Compute node 110A includes a memory 220A that contains an entropy generation mechanism 144A and a random number generation mechanism 146A. The entropy generation mechanism 144A includes a parity error detection mechanism 222A, an entropy pool 224A, and an entropy distribution mechanism 226A, similar to those shown in FIGS. 2 and 3 and discussed above. In similar fashion, compute node 110B includes a memory 220B that contains an entropy generation mechanism 144B and a random number generation mechanism 146B. The entropy generation mechanism 144A includes a parity error detection mechanism 222B, an entropy pool 224B, and an entropy distribution mechanism 226B. Compute node 100C includes a memory 220C that contains an entropy generation mechanism 144C and a random number generation mechanism 146C. The entropy generation mechanism 144C includes a parity error detection mechanism 222C, an entropy pool 224C, and an entropy distribution mechanism 226C. Compute node 100N includes a memory 220N that contains an entropy generation mechanism 144N and a random number generation mechanism 146N. The entropy generation mechanism 144N includes a parity error detection mechanism 222N, an entropy pool 224N, and an entropy distribution mechanism 226N.

An advantage of the configuration shown in FIG. 4 is each node has its own entropy pool, and can add entropy to its own entropy pool based on parity errors detected on the node, parity errors detected on other nodes, or entropy received from entropy distribution mechanisms in other nodes. In addition, the entropy each node adds to its own pool may be based on any suitable source of entropy. For example, time and location of a parity error may be used to generate entropy that is added to an entropy pool. One suitable example of time is clock time to a high precision (e.g., nanosecond) of a current parity error. Another suitable example of time is a computed difference between clock time of a current parity error and clock time of a past parity error. Location may include a chip identifier for a memory chip where a current parity error occurred. For the disclosure and claims herein, the term "chip identifier" extends to any suitable way to identify a chip. For example, a chip's serial number could be used as a chip identifier. In the alternative, the chip's location in the parallel computer system could also be used as a chip identifier. Another example of location is to perform a mathematical operation between a chip identifier for a current parity error and a chip identifier for a past parity error. By using both time and location of current and past parity errors, high-quality entropy can be added to an entropy pool to enhance the quality of generated random numbers. We assume for the example in FIG. 4 there is some node not shown in FIG. 4 with a software agent (as shown in FIG. 3) that requests a random number from one of the random number generation mechanisms 146A-N in FIG. 4.

Note three different topologies are shown in the figures. In a first shown in FIG. 1, the entropy generation mechanism 144 and random number generation mechanism 146 are shown in the service node 140. This topology implements these mechanisms 144 and 146 in a central location external to the compute nodes 110 that is accessible by the compute nodes 110. A second topology is shown in FIG. 3, where a compute node includes an entropy generation mechanism 144A and a random number generation mechanism 146A. A third topology is shown in FIG. 4, where multiple nodes each include an entropy generation mechanism and a random number generation mechanism. Note the topologies shown in FIGS. 3 and 4 could also include an entropy generation mechanism and a random number generation mechanism in the service node as shown in FIG. 1. In addition, the topology shown in FIG. 4 could extend to each node in the parallel computer system having its own entropy generation mechanism and random number generation mechanism. In an alternative not shown in the figures, multiple nodes could have respective entropy generation mechanisms, with a single random number generation mechanism that uses entropy from any suitable entropy pool or from multiple entropy pools (including all entropy pools) to generate a random number. The disclosure and claims herein expressly extend to any suitable number or location for entropy generation mechanisms and random number generation mechanisms in a parallel computer system.

Figure 5:
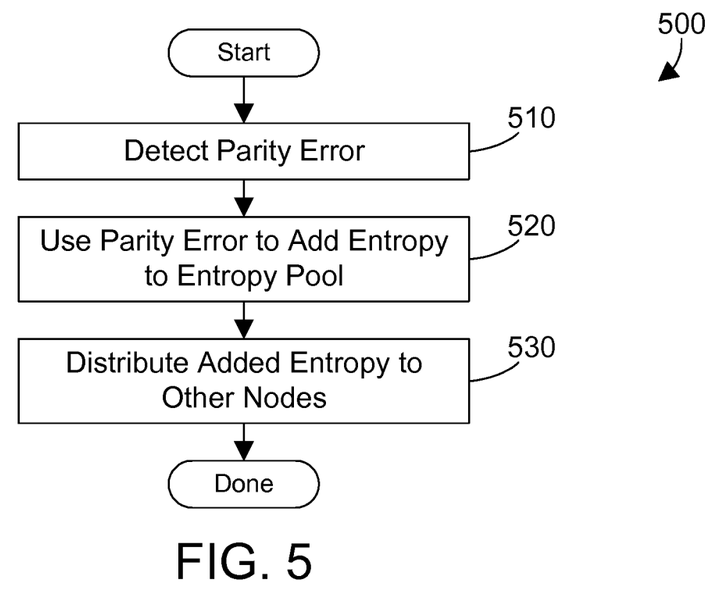
FIG. 5 is a flow diagram of a method for adding entropy to one or more nodes in a massively parallel computer system based on parity errors.

Referring to FIG. 5, a method 500 adds entropy to one or more entropy pools based on a detected parity error. A parity error is detected (step 510). The parity error is used to add entropy to one or more entropy pools (step 520). In an optional step, the entropy added to the one or more entropy pools may be distributed to other nodes as well (step 530).

Figure 6:
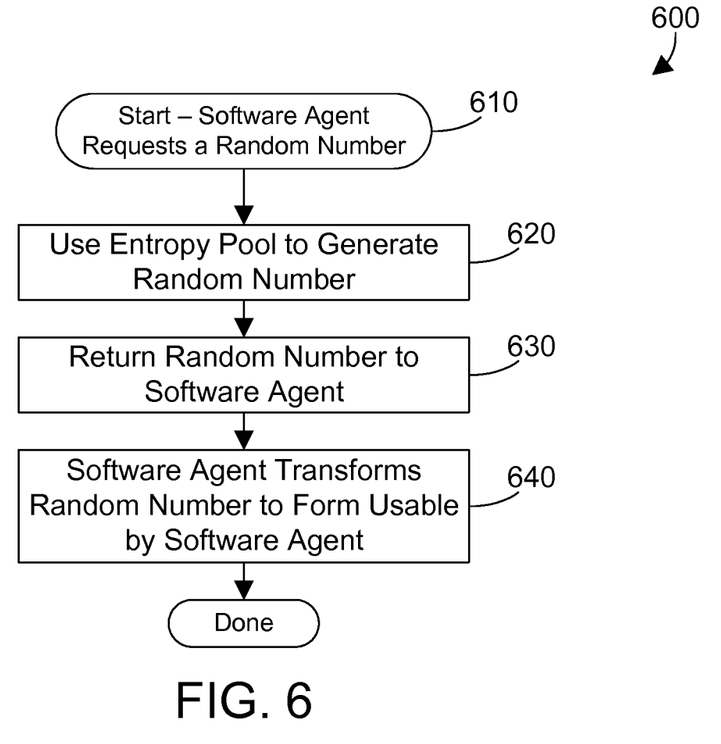
FIG. 6 is a flow diagram of a first method for a software agent to request and receive a random number generated from the entropy pool.

FIG. 6 shows a method 600 for using the entropy stored in an entropy pool to generate a random number. Method 600 starts when a software agent requests a random number (step 610). The entropy in one or more entropy pools is then used to generate a random number (step 620). The random number is returned to the software agent (step 630). The software agent then transforms the random number to a form usable by the software agent (step 640). Most random number generators return a number between 0 and 1. If the software agent requires a number scaled from zero to 10,000, the software agent could multiply the random number by 10,000 to achieve a random number in the range zero to 10,000.

Figure 7:
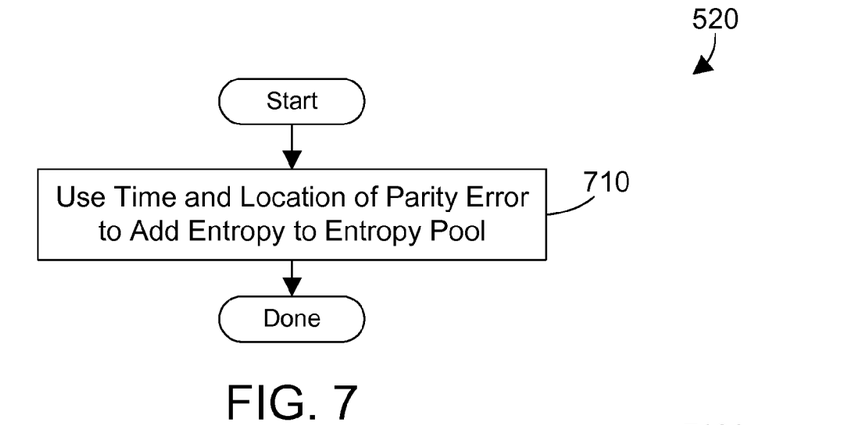
FIG. 7 is a flow diagram showing one possible implementation for step 520 in FIG. 5.
Figure 8:
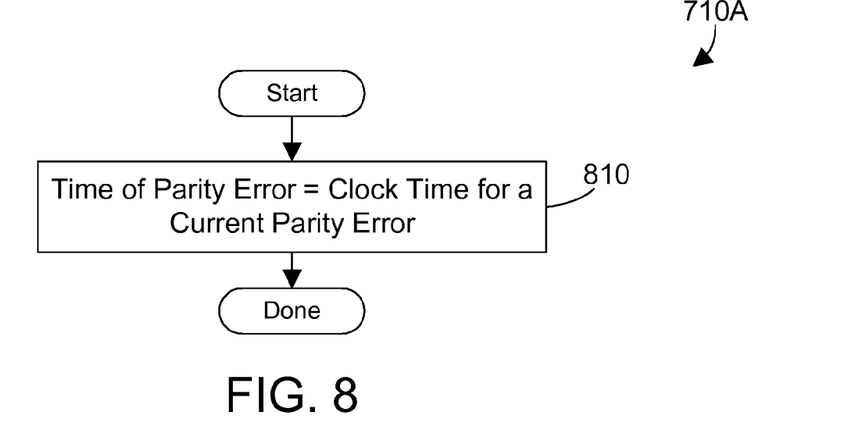
FIG. 8 is a flow diagram showing a first possible implementation for step 710 in FIG. 7.
Figure 9:
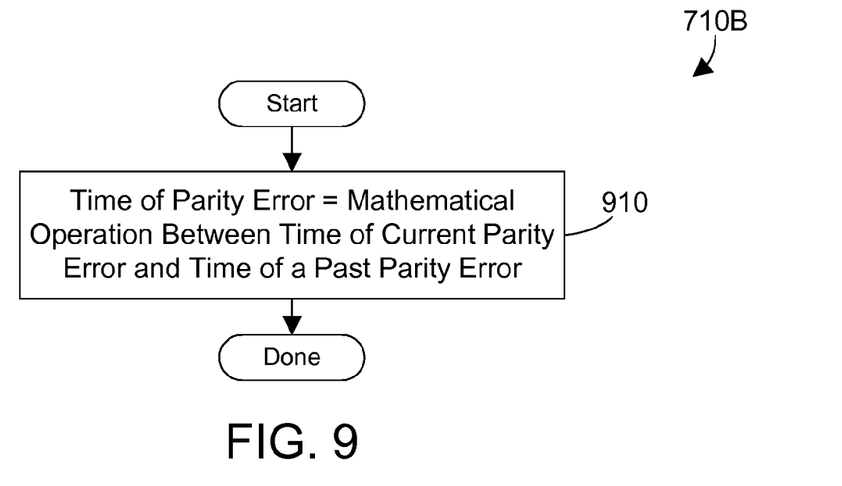
FIG. 9 is a flow diagram showing a second possible implementation for step 710 in FIG. 7.

Referring again to FIG. 5, step 520 uses a parity error to add entropy to one or more entropy pools. One suitable implementation for step 520 is shown as method 520 in FIG. 7, which includes the step of using time and location of the parity error to add entropy to the entropy pool (step 710). The disclosure and claims herein extend to any suitable implementation that uses time and location of one or more parity errors to add entropy to the entropy pool. Specific examples are shown in FIGS. 8-11. In FIG. 8, a first method 710A uses clock time of a current parity error to add entropy to the entropy pool. Note the clock time is preferably at a high level of accuracy, such as to the nanosecond. In FIG. 9, a second method 710B uses the time of the parity error is a mathematical operation between time of a current parity error and time of a past parity error (step 910). For example, the clock time of a current parity error could be subtracted from the clock time of a past parity error.

Figure 10:
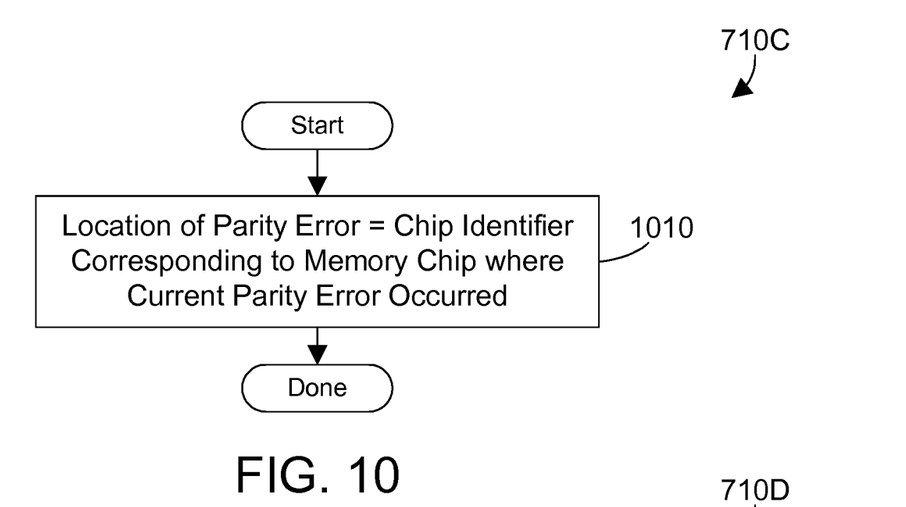
FIG. 10 is a flow diagram showing a third possible implementation for step 710 in FIG. 7.
Figure 11:
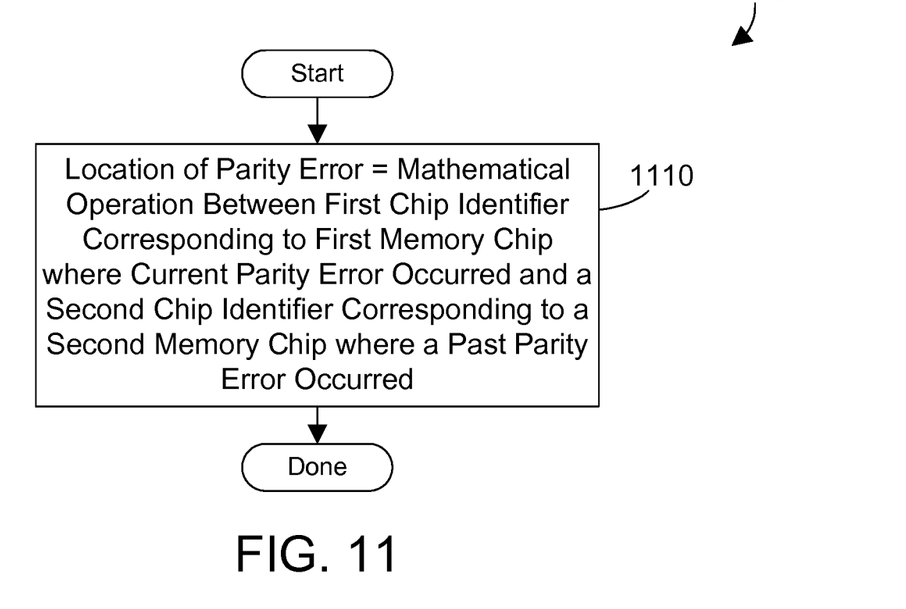
FIG. 11 is a flow diagram showing a fourth possible implementation for step 710 in FIG. 7.

In FIG. 10, a third method 710C defines location of the parity error as a chip identifier corresponding to a memory chip where the current parity error occurred (step 1010). In FIG. 11, a fourth method 710D defines location of the parity error as a mathematical operation between a first chip identifier corresponding to a first memory chip where the current parity error occurred and a second chip identifier corresponding to a second memory chip where a past parity error occurred (step 1110).

Figure 12:
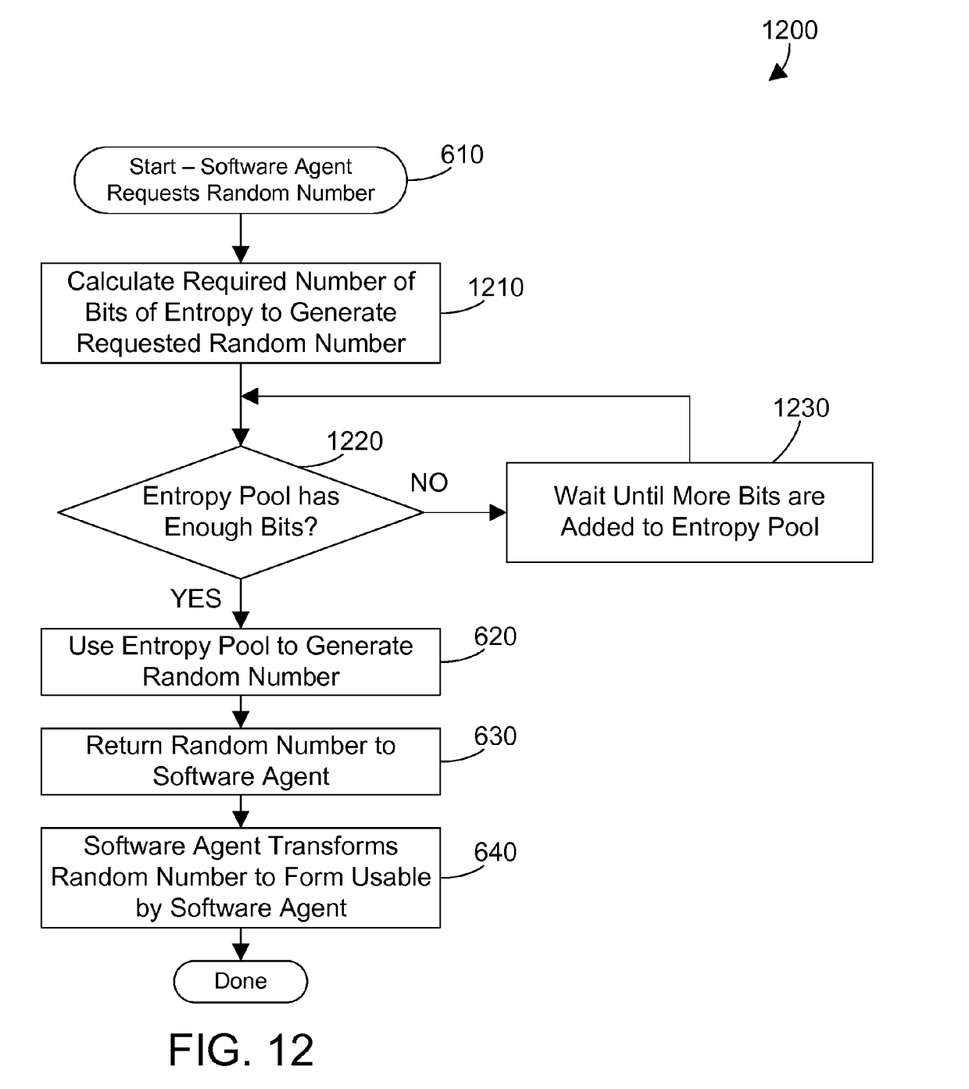
FIG. 12 is a flow diagram a second method for a software agent to request and receive a random number generated from the entropy pool.

While method 600 in FIG. 6 shows one implementation for a software agent to request and process a random number, FIG. 12 shows method 1200 which is a second implementation for a software agent to request and process a random number. Method 1200 begins when the software agent requests a random number (step 610). Method 1200 then calculates the required number of bits of entropy to generate the requested random number (step 1210). If the entropy pool has enough bits to generate the requested random number (step 1220=YES), the entropy pool is used to generate the random number (step 620), the random number is returned to the software agent (step 630) and the software agent transforms the random number to a form usable by the software agent (step 640). If the entropy pool does not have enough bits (step 1220=NO), method 1200 waits until more bits are added to the entropy pool (step 1230) until the entropy pool has enough bits to calculate the requested random number (step 1220=YES). Method 1200 thus adds to method 600 in FIG. 6 by calculating a required number of bits of entropy that is needed, and waiting until the entropy pool has the required number of bits before generating a random number from the entropy pool.

The quality of random number generation is improved by using parity errors, which are near-random events in a parallel computer system, to add entropy to the parallel computer system. By generating a random number based on the added entropy, the quality of the random number generation is improved.

One skilled in the art will appreciate that many variations are possible within the scope of the claims. Thus, while the disclosure has been particularly shown and described above, it will be understood by those skilled in the art that these and other changes in form and details may be made therein without departing from the spirit and scope of the claims.

The invention claimed is:

1. A computer implemented method for a software agent to receive a random number, the method comprising the steps of:
   providing a parallel computer system comprising a plurality of nodes, each node comprising a memory;
   detecting at least one parity error in at least one of the memories in the plurality of nodes;
   using time and location of the at least one parity error to add entropy to an entropy pool, wherein the location comprises a chip serial number corresponding to a memory chip where a current parity error occurred;
   using the entropy pool to generate a random number; and
   the software agent receiving the generated random number and transforming the generated random number to a form usable by the software agent.

2. The method of claim 1 wherein the time comprises clock time for a current parity error.

3. The method of claim 1 wherein the time comprises a mathematical operation between time of a current parity error and time of a past parity error.

4. The method of claim 1 wherein the location comprises a mathematical operation between a first chip serial number corresponding to a first memory chip where a current parity error occurred and a second chip identifier serial number corresponding to a second memory chip where a past parity error occurred.

5. The method of claim 1 further comprising the step of distributing the entropy added to the entropy pool to at least one other node.

6. A computer implemented method for a software agent to receive a random number, the method comprising the steps of:
   providing a parallel computer system comprising a plurality of nodes, each node comprising a memory;
   detecting at least one parity error in at least one of the memories in the plurality of nodes;
   using time and location of the at least one parity error in the at least one of the memories in the plurality of nodes to add entropy to a first entropy pool in a first node by performing a first mathematical operation between time of a current parity error and time of a past parity error and by performing a second mathematical operation between a first chip identifier corresponding to a first memory chip where a current parity error occurred and a second chip identifier corresponding to a second memory chip in the first node;
   distributing the entropy added to the first entropy pool in the first node to at least one other of the plurality of nodes;
   using time and location of the at least one parity error in the at least one of the memories in the plurality of nodes to add entropy to a second entropy pool in a second node by performing a third mathematical operation between time of a current parity error and time of a past parity error and by performing a fourth mathematical operation between a first chip identifier corresponding to a first memory chip where a current parity error occurred and a third chip identifier corresponding to a third memory chip in the second node;
   distributing the entropy added to the second entropy pool in the second node to at least one other of the plurality of nodes;
   using at least one of the first and second entropy pools to generate a random number; and
   the software agent receiving the generated random number and transforming the generated random number to a form usable by the software agent.

* * * * *